United States Patent [19]
Brisse et al.

[11] Patent Number: 6,091,527
[45] Date of Patent: Jul. 18, 2000

[54] COMMUNICATIONS DEVICE HAVING AN OPTICAL BUS, AND A METHOD FOR CONTROLLING ITS OPERATION

[75] Inventors: Konrad Brisse, Hattingen; Jens Hedrich, Bochum, both of Germany

[73] Assignee: Nokia Mobile Phones Limited, Espoo, Finland

[21] Appl. No.: 09/034,780

[22] Filed: Mar. 4, 1998

[30] Foreign Application Priority Data

Mar. 5, 1997 [DE] Germany ............... 197 08 979

[51] Int. Cl.⁷ .......................... H04B 10/00; H04B 10/04; H04B 10/06; H04B 10/12
[52] U.S. Cl. .................. 359/143; 359/154; 359/155
[58] Field of Search .................... 359/173, 143, 359/171, 168, 154; 455/90; 379/144, 59

[56] References Cited

U.S. PATENT DOCUMENTS

| | | | |
|---|---|---|---|
| 4,745,632 | 5/1988 | Duffy | 379/58 |
| 4,857,917 | 8/1989 | Sato | 340/825.57 |
| 5,007,050 | 4/1991 | Kasparian | 370/77 |
| 5,241,284 | 8/1993 | Nyqvist et al. | 330/297 |
| 5,291,542 | 3/1994 | Kivari et al. | 379/58 |
| 5,378,935 | 1/1995 | Korhonen et al. | 327/114 |
| 5,416,435 | 5/1995 | Jokinen et al. | 327/113 |
| 5,471,655 | 11/1995 | Kivari | 455/127 |
| 5,491,718 | 2/1996 | Gould et al. | 375/205 |
| 5,570,369 | 10/1996 | Jokinen | 370/95.3 |
| 5,581,244 | 12/1996 | Jokimies et al. | 340/825.44 |
| 5,588,041 | 12/1996 | Meyer, Jr. | 379/59 |
| 5,596,571 | 1/1997 | Gould et al. | 370/335 |
| 5,613,235 | 3/1997 | Kivari et al. | 455/343 |
| 5,636,264 | 6/1997 | Sulavuori | 379/56 |
| 5,642,063 | 6/1997 | Lehikoinen | 327/74 |
| 5,682,093 | 10/1997 | Kivela | 323/273 |
| 5,717,319 | 2/1998 | Jokinen | 323/280 |
| 5,845,204 | 12/1998 | Chapman | 455/343 |
| 5,910,944 | 6/1999 | Callicotte | 370/311 |
| 5,937,332 | 8/1999 | Karabinis | 455/12.1 |

FOREIGN PATENT DOCUMENTS 5-193427  3/1993  Japan.

*Primary Examiner*—Leslie Pascal
*Assistant Examiner*—Agustin Bello
*Attorney, Agent, or Firm*—Perman & Green, LLP

[57] ABSTRACT

An electronic communications device contains at least two modules (7, 8) which are connected to one another via an optical bus (4). In an energy-saving mode, each of the modules (7, 8) is switched to receive with a sampling period (P) which is the same for all modules (7, 8), and for a sampling time interval (T) which is short in comparison with the sampling period (P). One of these modules (7, 8) sends an interrupt signal (I) to the optical bus (4), whose duration is equal to or longer than the sampling period (P). At the latest on reception of the interrupt signal (I), the other module (7, 8) is switched to permanent receive in the next sampling time interval, so that data communication can then take place via the optical bus (4).

20 Claims, 4 Drawing Sheets

COMMUNICATIONS DEVICE HAVING AN OPTICAL BUS, AND A METHOD FOR CONTROLLING ITS OPERATION

The invention relates to a method for controlling an electronic device according to claim 1, which has a plurality of modules which are connected to one another via an optical bus, and to an electronic device according to claim 13 having a plurality of modules which are connected to one another via an optical bus for data communication.

In motor vehicles, integrated information and communications devices as well as navigation devices are frequently split into two or more modules for space reasons, since the user interfaces must be within the driver's reach but the overall information and communications device cannot be accommodated there. The majority of the device is thus located remotely, for example in the vehicle's boot or rear-seat area. For reasons relating to electromagnetic compatibility and weight, the individual modules are in this case connected to one another via an optical bus. However, the power consumption of the modules is relatively high so that, when the motor vehicle's ignition is switched off, it may be greater than a minimum limit specified by the motor vehicle industry, and this is undesirable. On the other hand, despite the motor vehicle's ignition being switched off, all the modules must be able to activate one another.

In the case of modules which are in a motor vehicle and are connected to one another via an optical bus, it has already been proposed for an electrical cable to be laid in parallel with the optical bus. When the motor vehicle's ignition is switched off, the individual modules are then completely switched off. When it is intended to activate the modules again, then a wake-up signal is sent via the electrical cable for this purpose.

However, the electrical cable which is additionally laid between the modules results in increased cable and installation costs and increases the total weight of the device under discussion. On the other hand, there is then a conductive electrical connection between the modules, which is disadvantageous from the point of view of electromagnetic compatibility and partially cancels out the advantages of an optical bus again, particularly with respect to DC-decoupling.

The invention is based on the object of overcoming the disadvantages described above and of ensuring that it is possible to carry out a wake-up from an energy-saving mode in a relatively simple and cost-effective manner.

The method according to the invention for controlling an electronic device which has at least two modules which are connected to one another via an optical bus comprises the following steps:
  in an energy-saving mode, each of the modules is switched to receive with a sampling period which is the same for all modules, and for a sampling time interval which is short in comparison with the sampling period,
  one of these modules sends an interrupt signal to the optical bus, whose duration is equal to or longer than the sampling period, and
  when an interrupt signal is received, at least one other of these modules is switched to permanent receive in the next sampling time interval.

According to the invention, it is thus possible to wake the modules up from the energy-saving mode using only the optical bus between the modules, without any necessity to lay an additional electrical cable between the modules. This considerably reduces the production costs of the electronic device and its assembly/installation costs. Although the optical receivers in the individual modules have to be switched to receive periodically in the energy-saving mode, this increases the total power consumption of the device in this mode only insignificantly and does not lead to the specified power limits being exceeded. Furthermore, by controlling the period duration of the sampling periods, the power consumption of the respective modules can be adjusted such that it is even possible to provide a certain amount of flexibility in terms of the power limits which must not be exceeded.

With respect to the sampling periods of the respective modules, it should be mentioned that they do not necessarily need to be in phase. All that is important is that their period duration is the same.

An energy-saving mode may be regarded as a mode in which a module operation controller which is connected to the optical receiver and to the optical transmitter, as well as the optical transmitter itself, are permanently switched off, that is to say they are not supplied with a supply voltage, or are in a standby mode, which consumes only a small amount of power.

If the electronic device has more than two modules, then the interrupt signal produced by one of the modules can be sent to all the other modules at the same time. When the interrupt signal is received, these other modules are then switched to permanent receive in the next sampling time interval. If the interrupt signal is sent at the same time to all the other modules that are part of the electronic device, all the modules are connected to the optical bus in parallel.

According to a refinement of the invention, the module which sends the interrupt signal is also switched to permanent receive when the interrupt signal is sent. The change to permanent receive thus takes place at a very early point in time so that even immediately after this an acknowledgement signal (originating from any of the other modules) relating to the wake-up process having been carried out can be received by the module initiating the wake-up. Data communication between the individual modules can thus start very early. In this case, the acknowledgement signal which is sent as a result of the received interrupt signal is likewise applied to the optical bus.

After the acknowledgement signals of all the modules that have been woken up are sent by data communication, starting then, between the modules, the system then waits until a guard time has passed. This guard time is chosen to be sufficiently long for all the modules to have reached a defined active operating mode within this guard time.

The acknowledgement signal may be a signal which is at a constant, for example high, logic level and which may also be equivalent to or identical to the interrupt signal. If the acknowledgement signal is shorter than the interrupt signal, it may be possible to start data communication earlier.

If the electronic device has more than two modules, then they may also be connected to one another in series via the optical bus. If there are more than two modules, the interrupt signal from one module may thus be sent to only one of the other modules in order to switch the latter to permanent receive in the next sampling time interval, this other module, after reception of the interrupt signal, itself sending an interrupt signal to the optical bus, which signal is sent to yet another of the modules in order then to switch this particular module to permanent receive in the next sampling time interval, etc. The modules connected to the optical bus are thus successively switched to permanent receive until even the last module has reached this state and itself sends back an interrupt signal to the first module which initially sent the interrupt signal. On reception of the interrupt signal from the last module, the said first module can then be switched to permanent receive in the next sampling time interval or, alternatively, this can be done when it first sends the interrupt signal.

After the module which sent the interrupt signal first has received the interrupt signal, data communication starting then between the modules is used to wait until a guard time has passed in which all the modules have reached a defined, active operating state.

The respective modules can be switched to the energy-saving mode again on the basis of a command signal. This may be achieved by driving the individual modules externally or internally, for example under program control. The command signal in the case of motor vehicles may be an "ignition OFF" signal.

The important factor for correct operation of the method is that the time duration of the interrupt signal is at least equal to, but preferably longer than, the period duration of the sampling period for the respective modules to sample the optical bus. This ensures that, from all the modules, at least one sampling signal occurs once in the time frame of the interrupt signal.

In the case of an electronic device according to the invention having a plurality of modules which are connected to one another via an optical bus for data communication, each module contains the following:

an optical receiver and an optical transmitter, both of which are connected to the optical bus, a module operation controller which is connected to the optical receiver and to the optical transmitter, and an energy-saving mode control unit which, when in the energy-saving mode, switches off the module operation controller and the optical transmitter and which is furthermore connected to the optical receiver in order to switch the latter to the energy-saving mode periodically and in order to identify a signal received by it, and is connected to the optical transmitter in order to pass the latter a signal for transmission.

The signal which can be supplied from the energy-saving mode control unit to the optical transmitter may be an interrupt signal whose duration is equal to or longer than the sampling period of the optical receivers. This interrupt signal may be at a constant, for example high, logic level, that is to say in the form of a DC signal or in the form of a specific bit pattern. On the other hand, once the wake-up process has been carried out, the energy-saving mode control unit may also supply as the signal to the optical transmitter an acknowledgement signal, which may correspond to the interrupt signal or, particularly in the case of modules connected to the optical bus in parallel, may also be shorter than it. In contrast, an interrupt signal from another module may be sampled via the optical receiver or, in the situation where its module has emitted an interrupt signal, an acknowledgement signal may be received via this optical receiver by another module, and may be passed on to the energy-saving mode control unit.

In principle, it is unnecessary for the module which sends the interrupt signal to have to receive from the other modules an acknowledgement signal relating to the wake-up process having been carried out. Data communication between the modules could also be carried out once a predetermined guard time has passed and after the end of the interrupt signal.

As already mentioned, data communication between the modules takes place using the module operation controller which has, for example, a transmit/receive unit which is connected to the optical receiver and to the optical transmitter and may itself be connected to a data processing unit. In this case, the optical receiver and the optical transmitter are essentially devices for converting optical signals into electrical signals and, respectively, for converting electrical signals into optical signals.

The optical bus between the respective modules may be only a single optical fibre, which allows signal transmission in different directions. Each of the modules must then contain coupling elements in order to allow signals to be output from the optical fibre to the optical receiver and to allow signals to be injected from the optical transmitter into the optical fibre. Alternatively, a plurality of optical fibres may also be laid between the modules in order to construct the optical bus such that it can transmit signals in different directions.

If there are only two modules, an optical receiver in one module is connected via a fibre to the optical transmitter in the other module, while the optical receiver in the other module is connected via another fibre to the optical transmitter in the first module.

If the electronic device has more than two modules, then they may alternatively be connected to one another in the form of a ring via the optical bus. The optical bus then extends in the form of a ring between the modules, to be precise such that a transmitter in one module is always connected to a receiver in another module. Sending of the interrupt signal by the module initiating the wake-up thus wakes up only a module which is adjacent to it, which itself sends an interrupt signal as a wake-up signal to yet another module, etc., until all the modules have been woken up.

The device according to the invention may, of course, be used not only in a motor vehicle but also in other locations, for example, in buildings, plants, aircraft and the like.

The invention will be described in detail in the following text with reference to the drawings, in which.

The following text explains exemplary embodiments of the present invention in detail.

Figure 1:
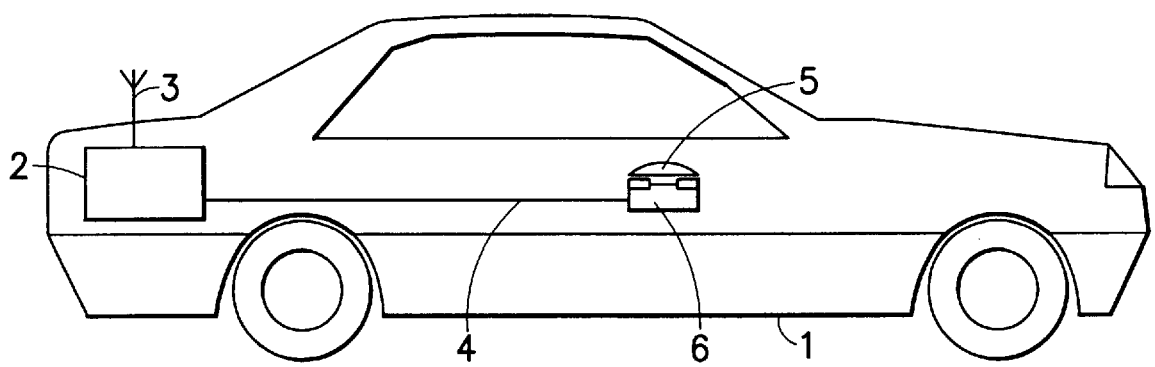
FIG. 1 shows the use of a device according to the invention in a motor vehicle.

According to FIG. 1, the invention is used, for example, in a motor vehicle 1, in whose boot a communications unit 2 is located which may be, for example, a telephone, and which is able to communicate with a base station via an antenna 3. The communications unit is connected via an optical bus 4 to a hands-free telephone set 5 which is located, for example, on the front centre console of the motor vehicle 1. The hands-free telephone set 5 may be kept on a rest 6.

Figure 2:
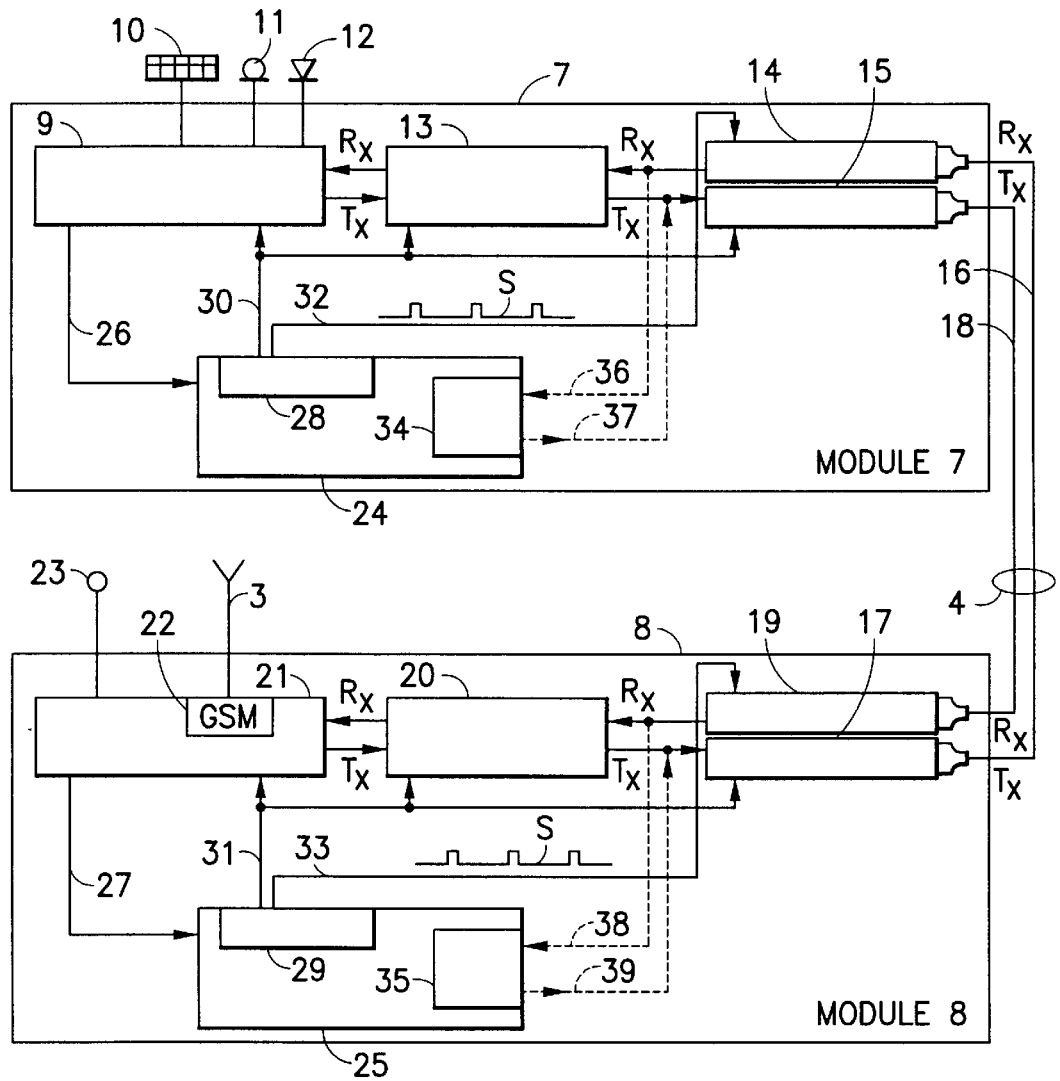
FIG. 2 shows a block diagram of the device according to the invention with two modules.

FIG. 2 shows the circuit configuration of the electronic device according to FIG. 1.

A first module 7 and a second module 8 are connected to one another via the optical bus 4. The first module 7 is in this case located in the handset 5, while the second module 8 is located in the communications unit 2.

The first module 7 includes a data processing device 9 and, connected to it, a key pad 10 for entering digits and letters, a microphone 11 and a loudspeaker 12. The data processing device 9 is connected to a transmit/receive unit 13 via RX and TX lines, and the transmit/receive unit 13 is itself connected via RX and TX lines respectively to an optical receiver 14 and an optical transmitter 15. The RX lines are called receive lines, while the TX lines are called transmit lines. The transmit/receive unit 13 is used to convert received data in accordance with a specified transmission protocol, while the optical receiver 14 and the optical transmitter 15 are devices which convert optical signals into electrical signals and, respectively, electrical signals into optical signals.

On the input side, the optical receiver 14 is god connected via a fibre 16, which is part of the optical bus 4, to the output of an optical transmitter 17 which is located in the second module 8. In contrast, the output side of the optical transmitter 15 in the first module 7 is connected via a further fibre 18, which is part of the optical bus 4, to the input side of an optical receiver 19 which is likewise located in the second module 8. The optical receiver 19 and the optical transmitter 17 in the second module 8 are respectively connected via RX and TX lines to a transmit/receive unit 20 in the second module 8, which itself is connected via RX and TX lines to a further data processing device 21, which is likewise located in the second module 8. This data processing device 21 contains a GSM unit 22, which itself is connected to the already mentioned antenna 3. It is now possible for a user of the telephone handset 5 to communicate with another subscriber via the input interface 10, 11 and 12 and the GSM unit 22, with the antenna 3 connected to it.

The data processing device 21 furthermore also has a data input connection 23, via which information relating to the ignition state (ON/OFF) of the motor vehicle can be entered.

Otherwise, an energy-saving mode control unit 24, 25 is located in each of the modules 7, 8. Each of the energy-saving mode control units 24, 25 can receive, via a line 26, 27, an energy-saving mode control signal from the associated data processing device 9 or 21, respectively. On the other hand, each energy-saving mode control unit 24, 25 contains a monitoring unit 28, 29 for monitoring the power supply for the data processing device 9, the transmit/receive unit 13 and the optical sensor 15 on the one hand, and for monitoring supply to the data processing device 21, the transmit/receive unit 20 and the optical transmitter 17 on the other hand. To this end, the monitoring unit 28 is connected via lines 30 to the units 9, 13 and 15, while the monitoring unit 29 is to this end connected via lines 31 to the units 21, 20 and 17.

The monitoring unit 28 is furthermore connected via a line 32 to the optical receiver 14 while, on the other hand, the monitoring unit 29 is connected via a line 33 to the optical receiver 19. The optical receivers 14, 19 in the energy-saving mode are periodically switched to receive via these lines 32, 33, in order to be able to detect interrupt signals and wake-up signals on the optical bus 4. This is explained in more detail further below. The switching signals for switching the optical receivers 14 and 19 on periodically are designated by the reference symbol S in FIG. 2. This is a pulse sequence with the pulse period P (see FIG. 3), which is also called the sampling period. The pulse width T corresponds to a sampling time interval.

Not least, each of the energy-saving mode control units 24, 25 respectively contains a wake-up control unit 34, 35. In this case, the wake-up control unit 34 is connected via an RX line 36 to the output of the optical receiver 14 on the one hand, and via a TX line 37 to the input of the optical transmitter 15 on the other hand. Furthermore, the wake-up control unit 35 is connected via an RX line 38 to the output of the optical receiver 19 on the one hand, and on the other hand via a TX line 39 to the input of the optical transmitter 17. The TX lines 37 and 39 can be used to carry interrupt signals and wake-up signals or alternatively acknowledgement signals, which may but need not differ from the interrupt signals, to the optical bus 4. The acknowledgement signals are used to confirm that the module being called is in the woken-up state. On the other hand, signals from the wake-up control units 34, 35 can be received via the RX lines 36 and 38, these signals reporting the presence of an interrupt signal (wake-up signal) on the optical bus 4, or themselves being acknowledgement signals.

The method of operation of the circuit shown in FIGS. 1 and 2 will be explained in more detail in the following text with reference to the signal diagram illustrated in FIG. 3.

In the following text, it is assumed that the data processing device 21 receives a signal via the data input connection 23 of the second module 8 indicating that the ignition system of the motor vehicle 1 has been switched off. This information is passed on the one hand via the line 27 to the energy-saving mode control unit 25 and on the other hand via the optical bus 4, the data processing device 9 and the line 26 to the energy-saving mode control unit 24. After this, the elements 9, 13 and 15 on the one hand, and the elements 21, 20 and 17 on the other hand, are changed to a standby mode by the respective monitoring units 28 and 29 in the energy-saving mode control units 24 and 25, in which standby mode they consume virtually no power. The optical transmitters 15 and 17 may also be switched off.

The monitoring units 28 and 29 then respectively send the switching signal S on the lines 32 and 33, respectively to the associated optical receiver 14 or 19, respectively, in order to switch the optical receivers on periodically in order that they can monitor the signal traffic on the optical bus 4. The switching signals S on the lines 32 and 33 have the same switching period and the same switching pulse, but their phases may differ from one another. In this context, there is no need for any synchronization between the switching signals S on the lines 32 and 33.

Figure 3:
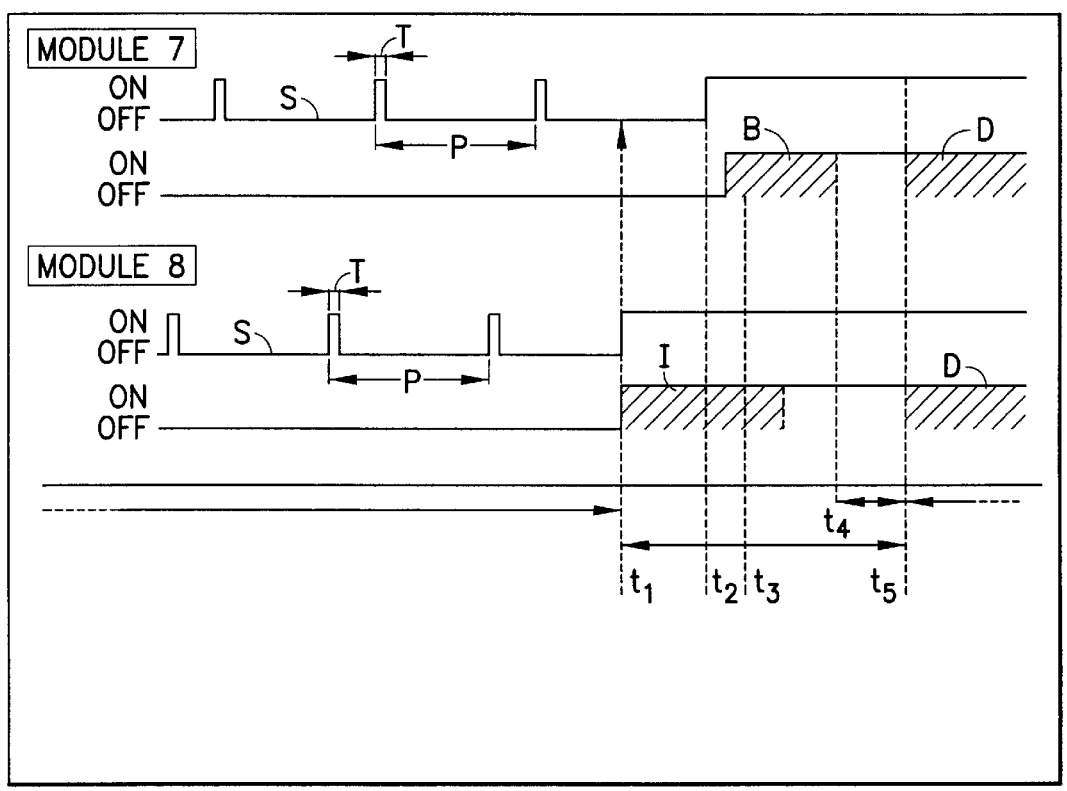
FIG. 3 shows a signal diagram to explain the method of operation of the device according to FIG. 2.

The energy-saving mode is thus active until the time t1 in FIG. 3. At the time t1, the wake-up control unit 35 produces an interrupt signal on the line 39, and this signal is transmitted to the optical transmitter 17. This interrupt signal may be produced, for example, on the basis of a request from the GSM system 22, for which purpose a corresponding information item is passed via the line 27 to the energy-saving mode control unit 25 which then activates, or completely switches on, the units 21, 20 and 17.

This interrupt signal is passed to the fibre 16 of the optical bus 4 and has a time duration which is at least equal to, but preferably longer than, the period of the switching signal S. The interrupt signal is designated by the reference symbol I in FIG. 3, and is at a constant, high logic level. At the same time that the interrupt signal I is emitted on the line 39, the monitoring unit 29 initiates a change in the switching signal S. This switching signal S on the line 33 then assumes a constant, high logic level, so that the optical receiver 19 remains permanently switched on.

If the optical receiver 14 in the first module 7 is switched on at the time t2 by the next pulse of the switching signal S on the line 32, then the signal (which is at a high logic level) on the fibre 16 is transmitted via the line 36 to the wake-up control unit 34. This interprets the received signal as a wake-up signal and now causes the monitoring unit 28 to raise the switching signal on the line 32 to a high logic level, so that the optical receiver 14 remains permanently switched on. At the same time, initiated by the wake-up control unit 34, the monitoring unit 28 activates the units 9, 13 and 15, or switches them on completely. A short time later, the wake-up control unit 34 emits an acknowledgement signal B on the line 37, this signal being at a high logic level and being passed via the optical transmitter 15 to the fibre 18 of the optical bus 4. This acknowledgement signal B, which may be shorter than interrupt signal I, is detected by the optical receiver 19 and is passed via the line 38 to the wake-up control unit 35, so that the latter identifies at the time t3 the acknowledgement received by the first module 7.

After the end of the acknowledgement signal B at the time t4, there is another predetermined waiting period until the time t5 before an interchange of data D takes place via the optical bus 4, using the units 9, 13 and 21, 20. The time interval between t1 and t5 is generally called the wake-up time.

This case has described how the command to produce an interrupt signal I is passed via the line 27 of the second module 8. Alternatively and instead of this, this signal can be entered via the interface 10, 11, 12 and can be passed via the line 26 of the first module 7 to the energy-saving mode control unit 24, so that the processes then take place in the opposite sequence.

Figure 4:
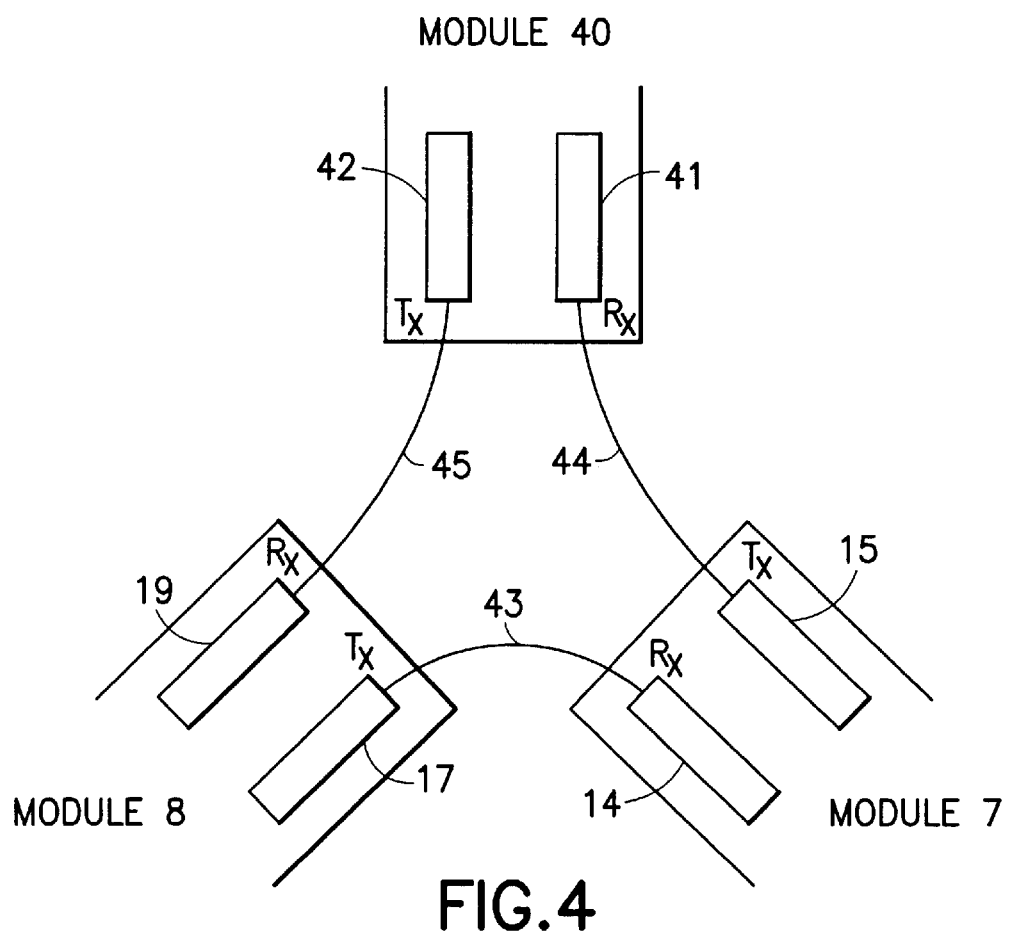
FIG. 4 shows a block diagram of a device according to the invention with more than two modules connected to an optical bus in the form of a ring.

FIG. 4 shows a further refinement of the device according to the invention, with three modules connected to an optical bus in the form of a ring.

The design of the modules 7, 8 and 40 corresponds to that of the modules 7 and 8 in FIG. 2. This design will therefore not be described once again at this point.

In detail, the output of the optical transmitter 17 of the module 8 is connected via an optical fibre 43 to the input of the optical receiver 14 in the module 7. The output of the optical transmitter 15 in the module 7 is connected via an optical fibre 44 to the input of an optical receiver 41 in the module 40. In contrast, the output of an optical transmitter 42 in the module 40 is connected via an optical fibre 45 to the input of the optical receiver 19 in the module 8.

If, for example, the module 8 emits the wake-up interrupt signal I via its optical transmitter 17, then this signal is detected in the next sampling time interval T by the optical receiver 14 in the module 7, which is thus switched to permanent receive. A short time later, the module 7 likewise emits an interrupt signal I via its optical transmitter 15 to the optical fibre 44, this signal being identical to the first-mentioned interrupt signal. This interrupt signal, which is sent via the optical fibre 44, is detected in the next sampling time interval T by the optical receiver 41 in the module 40, which is then switched to permanent receive. Shortly after this, the module 40 then also emits an identical interrupt signal via its optical transmitter 42 to the optical fibre 45, and this signal is received in the next sampling time interval T by the optical receiver 19 in the module 8. At this time at the latest, the module 8 can be switched to permanent receive, but alternatively this can occur earlier, to be precise if its interrupt signal is sent via the optical transmitter 17.

As already mentioned, all the modules 7, 8 and 40 are continually switched to receive with the same sampling period P and over a sampling time interval T which is short in comparison with this sampling period P. All the interrupt signals on the fibres 43, 44 and 45 therefore have to have a duration which is equal to or longer than this sampling period P. All the interrupt signals are preferably identical.

Otherwise, the method of operation of the arrangement shown in FIG. 4 corresponds to that in FIG. 2, so that there is no need to describe it once again.

What is claimed is:

1. Method for controlling an electronic device which has at least two modules (7,8) which are connected to one another via an optical bus (4), the method comprising the steps of:

in an energy-saving mode, each of the modules (7,8) is switched to receive with a sampling period (P) which is the same for all modules (7,8), and for a sampling time interval (T) which is short in comparison with the sampling period (P), one of these modules (7,8) sends an interrupt signal (I) to the optical bus (4), whose duration is equal to or longer than the sampling period (P), and when an interrupt signal (I) is received, at least one other of these modules (7,8) is switched to permanent receive in the next sampling time interval (T) wherein the module (8) which sends the interrupt signal (I) is switched to permanent receive when the interrupt signal (I) is sent.

2. Method according to claim 1, characterized in that, if there are more than two modules, all the other modules are sent the interrupt signal (I) at the same time, so that, on receipt of the interrupt signal (I), these other modules can be switched to permanent receive in the next sampling time interval (T).

3. Method according to claim 1, characterized in that those modules (7) which have received the interrupt signal (I) send an acknowledgement signal (B) to the optical bus (4).

4. Method according to claim 3, characterized in that, after sending all the acknowledgement signals (B) of the said modules by means of data communication starting then between the modules (7, 8), the system then waits until a guard time (t4–t5) has passed.

5. Method according to claim 3, characterized in that the acknowledgement signals which are sent are interrupt signals or signals which are shorter than the interrupt signals.

6. Method according to claim 1, characterized in that, if there are more than two modules, the interrupt signal (I) of one module is sent only to one of the other modules in order to switch this module to permanent receive in the next sampling time interval (T), in that, on receipt of the interrupt signal, this other module itself sends an interrupt signal to the optical bus, and this interrupt signal is sent to yet another of the modules in order to switch this module to permanent receive in the next sampling time interval (T), etc.

7. Method according to claim 6, characterized in that the module which sends the interrupt signal (I) first receives an interrupt signal (I) sent by the last of the other modules.

8. Method according to claim 7, characterized in that, on reception of the interrupt signal (I), the said module is switched to permanent receive in the next sampling time interval (T).

9. Method according to claim 6, characterized in that the module which sends the interrupt signal (I) first is switched to permanent receive when the interrupt signal (I) is sent.

10. Method according to claim 7, characterized in that, once one module has received the interrupt signal (I) by means of data communication starting then between the modules, the system then waits until a guard time has passed.

11. Method according to one of claims 1, characterized in that the modules (7, 8) are switched to the energy-saving mode again as a function of a command signal.

12. Electronic device having a plurality of modules (7, 8) which are connected to one another via an optical bus (4) for data communication, and in which each module (7, 8) contains the following:

an optical receiver (14, 19) and an optical transmitter (15, 17), both of which are connected to the optical bus (4), a module operation controller (9, 13; 20, 23) which is connected to the optical receiver (14, 19) and to the optical transmitter (15, 17), and an energy-saving mode control unit (24, 25) which, when in the energy-saving mode, switches off the module operation controller and the optical transmitter (15, 17) and which is furthermore connected to the optical receiver (14, 19) in order to switch the latter to the energy-saving mode periodically and in order to identify a signal (I, B) received by it, and is connected to the optical transmitter (15, 17) in order to pass the latter a signal (I, B) for transmission.

13. Electronic device according to claim 12, characterized in that the energy-saving mode control unit (24, 25) can emit interrupt signals with a duration which is equal to or longer than the switched-on period (P) of the optical receiver (14, 19).

14. Electronic device according to claim 13, characterized in that the energy-saving mode control unit (24, 25) can output acknowledgement signals (B) relating to wake-up having taken place.

15. Electronic device according to claim 14, characterized in that the acknowledgement signals correspond to the interrupt signals.

16. Electronic device according to claim 15, characterized in that the interrupt signals and acknowledgement signals are at a constant logic level.

17. Electronic device according to one of claims 12, characterized in that the module operation controller has a transmit/receive unit (13, 20) which is connected to the optical receiver (14, 19) and to the optical transmitter (15, 17).

18. Electronic device according to claim 17, characterized in that a data processing device (9, 21) is connected to the transmit/receive unit (13, 20).

19. Electronic device according to one of claims 12 characterized in that the optical bus (4) has a plurality of optical fibres (16, 18) or channels for sending signals in different directions.

20. Electronic device according to one of claims 12 characterized in that, if there are more than two modules, the optical bus runs in the form of a ring between the modules, to be precise always from the transmitter of one module to the receiver of another module.

* * * * *